US008325788B2

(12) United States Patent
Khan

(10) Patent No.: US 8,325,788 B2
(45) Date of Patent: Dec. 4, 2012

(54) PRECODING SIGNALING IN A MIMO WIRELESS COMMUNICATION SYSTEM

(75) Inventor: Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/414,582

(22) Filed: Mar. 7, 2012

(65) Prior Publication Data

US 2012/0170540 A1 Jul. 5, 2012

Related U.S. Application Data

(63) Continuation of application No. 13/171,066, filed on Jun. 28, 2011, and a continuation of application No. 11/882,316, filed on Jul. 31, 2007, now Pat. No. 7,995,642.

(60) Provisional application No. 60/899,578, filed on Feb. 5, 2007.

(51) Int. Cl.
H04L 27/00 (2006.01)
(52) U.S. Cl. ........................................ 375/219

(58) Field of Classification Search .................. 375/219, 375/216, 130, 134, 147, 221, 269, 295, 316, 375/326; 455/67.11, 515; 370/216, 473
See application file for complete search history.

(56) References Cited

U.S. PATENT DOCUMENTS

| 7,649,959 | B2 | 1/2010 | Tirkkonen et al. |
| 7,916,621 | B2 | 3/2011 | Khan et al. |
| 2003/0227875 | A1* | 12/2003 | Wei et al. ...................... 370/252 |
| 2005/0170782 | A1* | 8/2005 | Rong et al. .................. 455/67.11 |
| 2006/0287743 | A1* | 12/2006 | Sampath et al. ................ 700/90 |
| 2007/0183451 | A1 | 8/2007 | Lohr et al. |
| 2008/0069031 | A1 | 3/2008 | Zhang et al. |
| 2009/0046652 | A1 | 2/2009 | Shitara et al. |

* cited by examiner

Primary Examiner — Khai Tran

(57) ABSTRACT

A method for performing data transmission between a transmitter and a receiver. The method includes the steps of generating a feedback message at the receiver in response to data received from the transmitter, assigning an identifier for the feedback message, storing the feedback message in association with the identifier in the receiver, transmitting the feedback message and the identifier to the transmitter, determining, at the transmitter, transmission format for data to be transmitted to the receiver based on the feedback message received from the receiver; and transmitting data and a control message, by the transmitter, using the determined transmission format, with the control message comprising the identifier of the feedback message based on which the transmission format is determined.

17 Claims, 11 Drawing Sheets

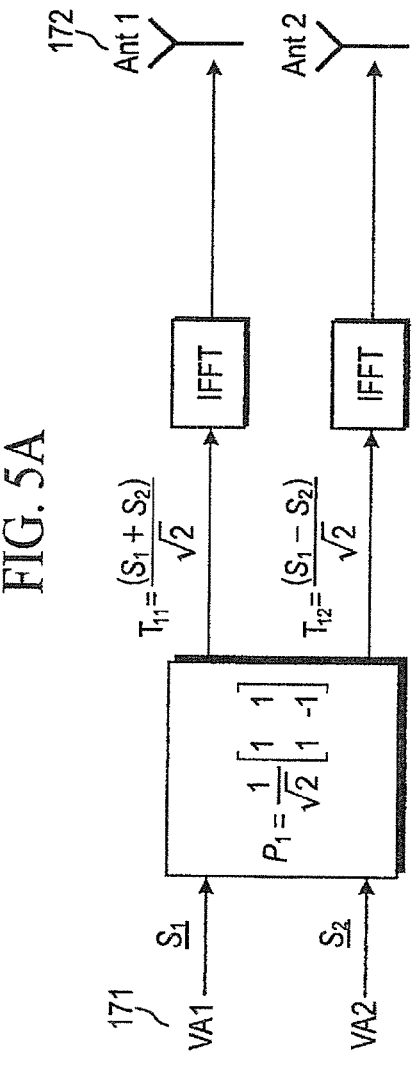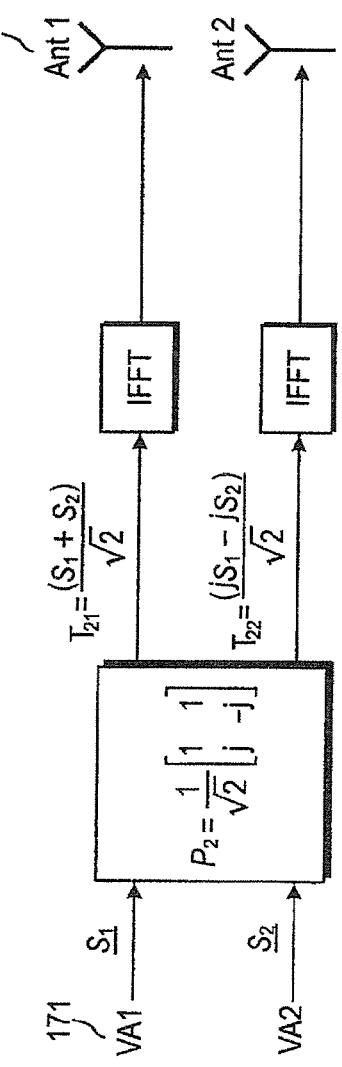

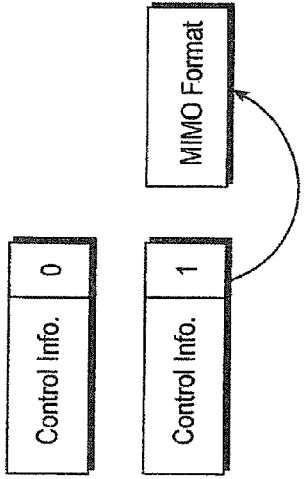
FIG. 15
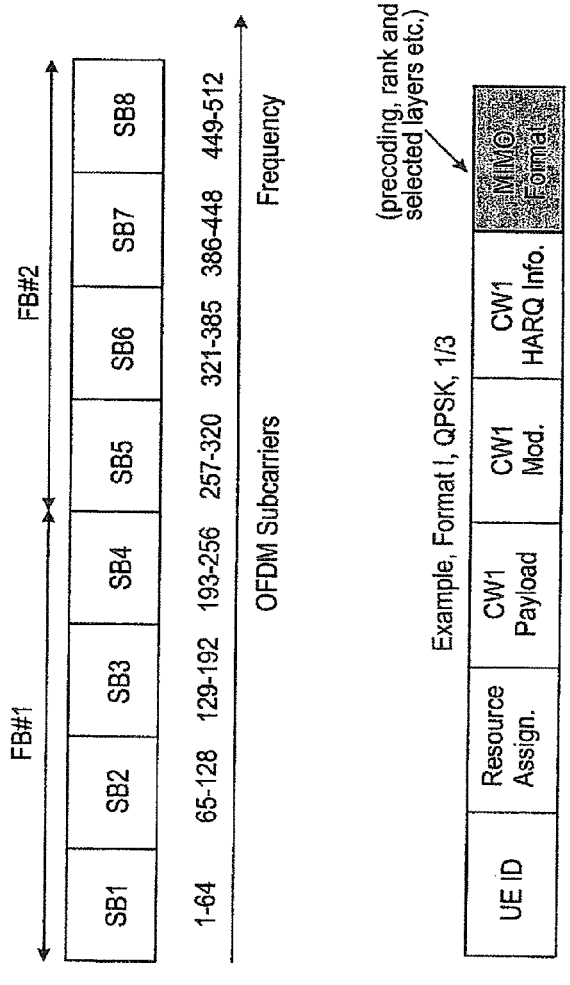
FIG. 16
FIG. 18

PRECODING SIGNALING IN A MIMO WIRELESS COMMUNICATION SYSTEM

PRIORITY

This application claims priority as a continuation of U.S. patent application Ser. No. 13/171,066 filed Jun. 28, 2011, entitled "PRECODING SIGNALING IN A MIMO WIRELESS COMMUNICATION SYSTEM," and as a continuation of U.S. patent application Ser. No. 11/882,316 filed Jul. 31, 2007 now U.S. Pat. No. 7,995,642. This application further claims priority to U.S. Provisional Patent Application Ser. No. 60/899,578 filed Feb. 5, 2007. The content of the above-identified patent documents is hereby incorporated by reference.

BACKGROUND OF THE INVENTION

1. Field of the Invention

The present invention relates to a method for transmitting data in a closed-loop multiple input multiple output system, and more specifically, a method for transmitting information regarding transmission format in a closed-loop multiple input multiple output system.

2. Description of the Related Art

Orthogonal Frequency Division Multiplexing (OFDM) is a popular wireless communication technology to multiplex data in frequency domain.

A multiple antenna communication system, which is often referred to as multiple input multiple output (MIMO) system, is widely used in combination with OFDM technology, in a wireless communication system to improve system performance.

In a MIMO system, both transmitter and receiver are equipped with multiple antennas. Therefore, the transmitter is capable of transmitting independent data streams simultaneously in the same frequency band. Unlike traditional means of increasing throughput (i.e., the amount of data transmitted per time unit) by increasing bandwidth or increasing overall transmit power, MIMO technology increases the spectral efficiency of a wireless communication system by exploiting the additional dimension of freedom in the space domain due to multiple antennas. Therefore MIMO technology can significantly increase the throughput and range of the system.

When the transmission channels between the transmitters and the receivers are relatively constant, it is possible to use a closed-loop MIMO scheme to further improve system performance. In a closed-loop MIMO system, the receiver informs the transmitter of feedback information regarding the channel condition. The transmitter utilizes this feedback information, together with other considerations such as scheduling priority, data and resource availability, to optimize the transmission scheme.

A popular closed-loop MIMO scheme is MIMO precoding. With precoding, the data streams to be transmitted are precoded, i.e., pre-multiplied by a precoding matrix, before being passed on to the multiple transmit antennas in a transmitter.

In a contemporary closed-loop MIMO precoding scheme, when a transmitter precodes data before transmitting the data to a receiver, the transmitter informs the receiver of the precoding information such as an identification of the precoding matrix by transmitting dedicated pilots (also referred to as reference signals) or explicit control information that carries the precoding information. A significant problem with this approach is that the control information inefficiently consumes a significant amount of system resources and degrades the overall system throughput and capacity.

SUMMARY OF THE INVENTION

It is therefore an object of the present invention to provide an improved system and an improved method for transmitting data in a closed-loop multiple input multiple output (MIMO) system.

It is another object to provide an improved system and an improved method that is capable of transmitting data in a closed-loop MIMO system to save system resources and to improve overall system throughput and capacity.

According to one aspect of the present invention, there is provided a system and a method for performing data transmission between a transmitter and a receiver, by generating a feedback message at the receiver in response to a reference signals or a pilot signal received from the transmitter, assigning an identifier for the feedback message, storing the feedback message in association with the identifier in the receiver, transmitting the feedback message and the identifier to the transmitter, determining, at the transmitter, the transmission format for data to be transmitted to the receiver based on the feedback message received from the receiver; and transmitting data and a control message, via the transmitter, using the determined transmission format, with the control message comprising the identifier of the feedback message based on which the transmission format is determined.

When the receiver receives data and the identifier of the feedback message from the transmitter, the receiver may look up information corresponding to the transmitted identifier and process the received data according to that information.

When the feedback message transmitted from the receiver and received by the transmitter contains errors, the transmitter may determine transmission format based on another feedback message received by the transmitter prior to the erroneous feedback message.

The identifier of the feedback message may be a number.

The number may indicate the index of the feedback message in a series of feedback messages transmitted by the receiver, with the smallest number indicating that the feedback message being the first one of the series of feedback message transmitted by the receiver.

Alternatively, the number may indicate the index of the feedback message in a series of feedback messages previously received by the transmitter, with the smallest number indicating that the feedback message being the most recent feedback message that is received by the transmitter.

Still alternatively, the number may a subframe number during which the feedback message is transmitted.

The number may be represented by binary digits.

The transmission format may be established in dependence upon frequency subbands in which the data is to be transmitted.

According to another aspect of the present invention, there is provided a system and a method for performing data transmission between a transmitter and a receiver, by generating a feedback message at the receiver in response to a reference signal or a pilot signal received from the transmitter, transmitting the feedback message to the transmitter, storing information in the feedback message in the receiver, deciding, at the transmitter, whether to transmit data to the receiver according to a first transmission format determined based on the feedback message received from the receiver, or according to a second transmission format which is not related to the feedback message received from the receiver, and transmitting data and a control message, by the transmitter, using either the first transmission format or the second transmission format, and when the first transmission format is used, informing the receiver that the transmission format is determined based on the feedback message received from the receiver, and when the second transmission format is used, informing the receiver that the transmission format is not related to the feedback message received from the receiver and transmitting the second transmission format to the receiver.

When the first transmission format is used, the transmitter may inform the receiver that the transmission format is determined based on the feedback message received from the receiver by including a bit '0' in the control message transmitted to the receiver.

When the second transmission format is used, the transmitter may inform the receiver that the transmission format is not related to the feedback message received from the receiver by including a bit '1' in the control message transmitted to the receiver.

According to still another aspect of the present invention, there is provided a system and a method for performing data transmission between a transmitter and a receiver, including the steps of generating a feedback message at the receiver in response to a reference signal or a pilot signal received from the transmitter, transmitting the feedback message to the transmitter, transmitting data from the transmitter to the receiver, transmitting a control message which carries a transmission format used for the data transmission, decoding, at the receiver, the control message in order to obtain the transmission format of the data transmitted from the transmitter, and, when the decoding is successful, processing the data received from the transmitter according to the obtained transmission format, and when the decoding is unsuccessful, processing the data received from the transmitter according to the most recent feedback message that the receiver has sent to the transmitter.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 5A and FIG. 5B are examples of precoding in a precoding MIMO-system suitable for the practice of the principles of the present invention;

FIG. 15 illustrates MIMO feedback and signaling according to a sixth embodiment of the principles of the present invention;

FIG. 16 illustrates MIMO feedback and signaling according to a seventh embodiment of the principles of the present invention;

FIG. 18 illustrates an example of Physical Downlink Control Channel (PDCCH) containing MIMO transmission format information according to the principles of the present invention.

DETAILED DESCRIPTION OF THE INVENTION

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

Figure 1:
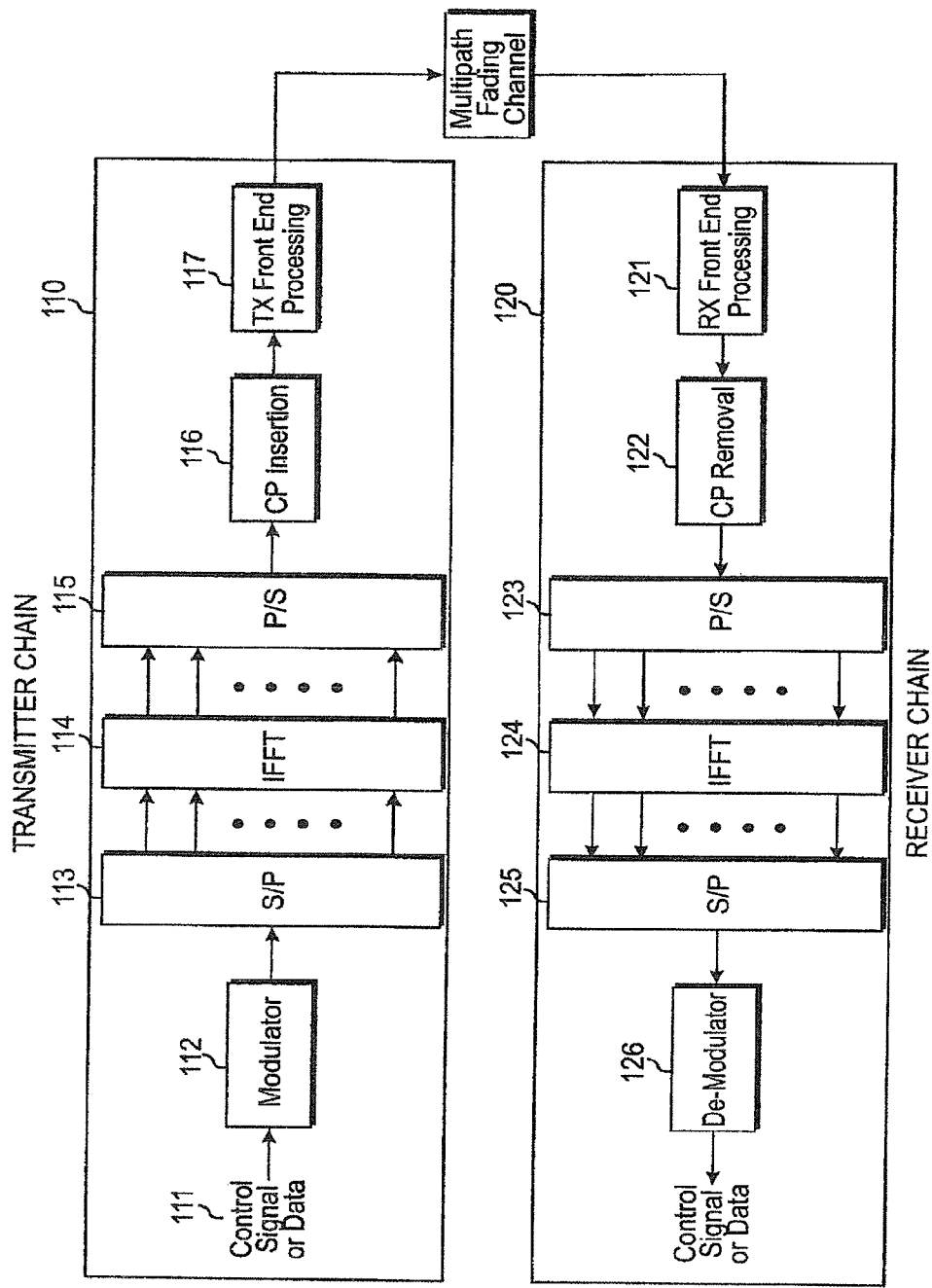
FIG. 1 is an illustration of an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
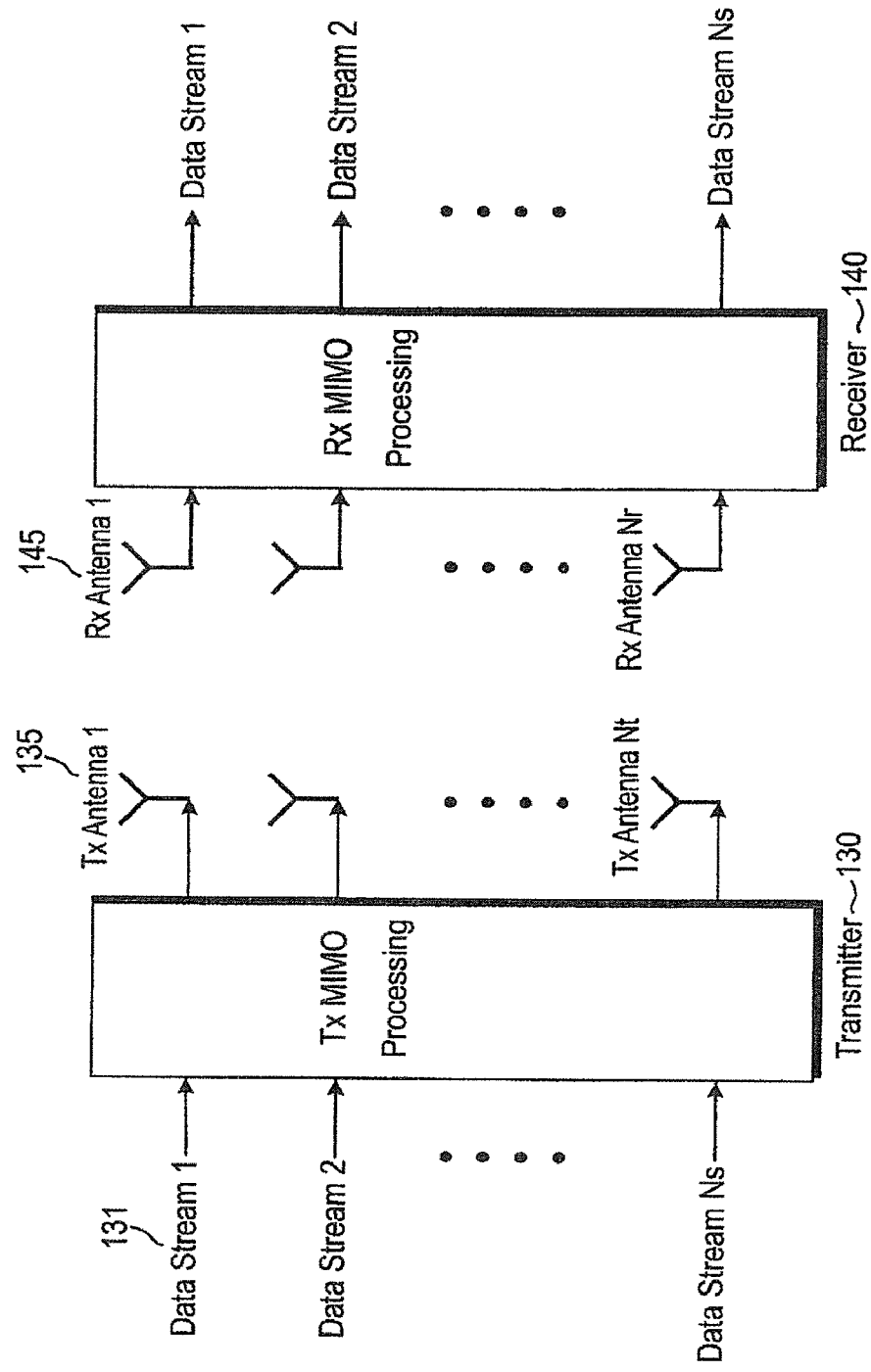
FIG. 2 is an illustration of a multiple input multiple output (MIMO) system suitable for the practice of the principles of the present invention.

FIG. 2 illustrates a multiple input multiple output (MIMO) system. In a MIMO system, transmitter 130 and receiver 140 are respectively equipped with multiple antennas 135 and 145. Therefore, transmitter 130 is capable of transmitting independent data streams 131 simultaneously in the same frequency band.

Figure 3:
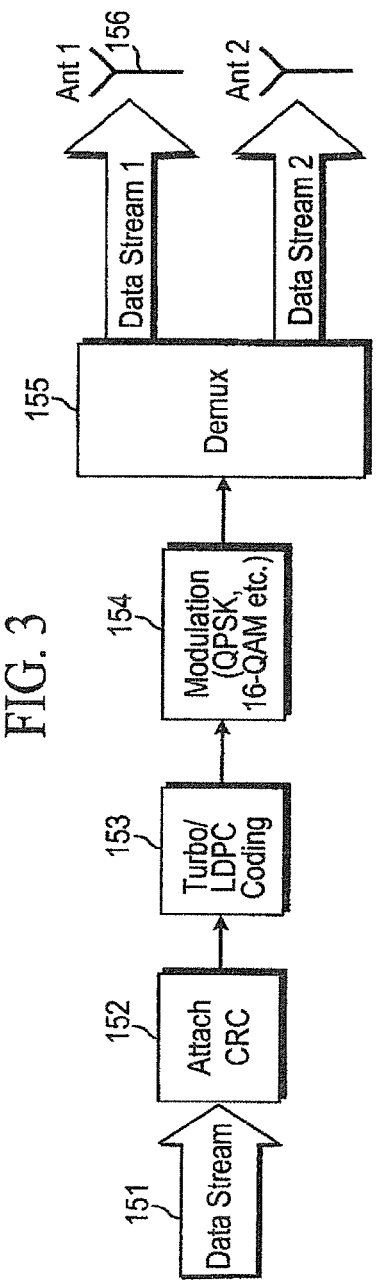
FIG. 3 is an illustration of a single-code word MIMO scheme suitable for the practice of the principles of the present invention.

An example of a single-code word MIMO scheme is given in FIG. 3. In case of single-code word MIMO transmission, a cyclic redundancy check (CRC) 152 is added to a single data stream 151 and then coding 153 and modulation 154 are sequentially performed. The coded and modulated symbols are then demultiplexed 155 for transmission over multiple antennas 156.

Figure 4:
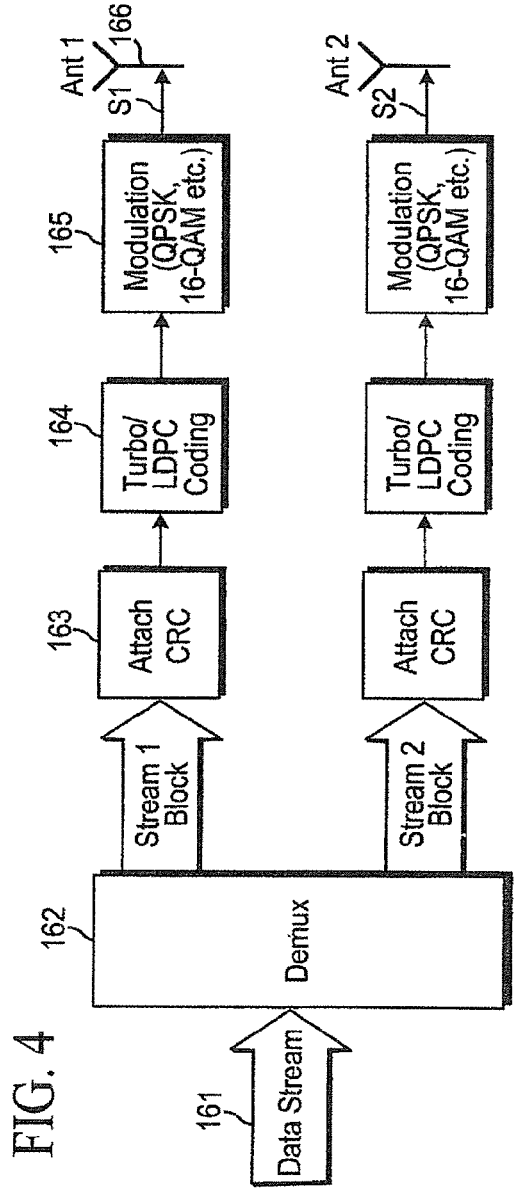
FIG. 4 is an illustration of a multi-code word MIMO scheme suitable for the practice of the principles of the present invention.

In case of multiple-code word MIMO transmission, shown in FIG. 4, data stream 161 is demultiplexed 162 into smaller stream blocks. Individual CRCs 163 are attached to these smaller stream blocks and then separate coding 164 and modulation 165 is performed on these smaller blocks. These smaller blocks are then transmitted via separate MIMO antennas 166. It should be noted that in case of multi-code word MIMO transmissions, different modulation and coding can be used on each of the individual streams resulting in a so called PARC (per antenna rate control) scheme. Also, multi-code word transmission allows for more efficient post-decoding and interference cancellation because a CRC check can be performed on each of the code words before the code word is cancelled from the overall signal. In this way, only correctly received code words are cancelled to avoid any interference propagation in the cancellation process.

When the transmission channels between the transmitters and the receivers are relatively constant, it is possible to use a closed-loop MIMO scheme to further improve system performance. In a closed-loop MIMO systems, the receiver informs the transmitter of the feedback information regarding the channel condition. The transmitter utilizes this feedback information, together with other considerations such as scheduling priority, data and resource availability, to optimize the transmission scheme.

A popular closed-loop MIMO scheme is MIMO precoding. With precoding, the data streams to be transmitted are precoded, i.e., pre-multiplied by a precoding matrix, before being passed on to the multiple transmit antennas in a transmitter.

An optional precoding protocol that employs a unitary pre-coding before mapping the data streams to physical antennas is shown in FIGS. 5A and 5B. The optional precoding creates a set of virtual antennas (VA) 171 before the pre-coding. In this case, each of the codewords is potentially transmitted through all the physical transmission antennas 172. Two examples of unitary precoding matrices, $P_1$ and $P_2$ for the case of two transmission antennas 172 may be:

$$P_1 = \frac{1}{\sqrt{2}}\begin{bmatrix} 1 & 1 \\ 1 & -1 \end{bmatrix}, P_2 = \frac{1}{\sqrt{2}}\begin{bmatrix} 1 & 1 \\ j & -j \end{bmatrix} \quad (1)$$

Assuming modulation symbols $S_1$ and $S_2$ are transmitted at a given time through stream 1 and stream 2 respectively. Then the modulation symbol $T_1$ after precoding with matrix $P_1$ in the example as shown in FIG. 5A and the modulation symbol $T_2$ after precoding with matrix $P_2$ in the example as shown in FIG. 5B can be respectively written as:

$$T_1 = P_1 \begin{bmatrix} S_1 \\ S_2 \end{bmatrix} = \frac{1}{\sqrt{2}} \begin{bmatrix} 1 & 1 \\ 1 & -1 \end{bmatrix} \times \begin{bmatrix} S_1 \\ S_2 \end{bmatrix} = \frac{1}{\sqrt{2}} \begin{bmatrix} S_1 + S_2 \\ S_1 - S_2 \end{bmatrix} \quad (2)$$

$$T_2 = P_2 \begin{bmatrix} S_1 \\ S_2 \end{bmatrix} = \frac{1}{\sqrt{2}} \begin{bmatrix} 1 & 1 \\ j & -j \end{bmatrix} \times \begin{bmatrix} S_1 \\ S_2 \end{bmatrix} = \frac{1}{\sqrt{2}} \begin{bmatrix} S_1 + S_2 \\ jS_1 - jS_2 \end{bmatrix}$$

Therefore, the symbols $$T_{11} = \frac{(S_1 + S_2)}{\sqrt{2}} \text{ and } T_{12} = \frac{(S_1 - S_2)}{\sqrt{2}}$$

will be transmitted via antenna 1 and antenna 2, respectively, when precoding is done using precoding matrix $P_1$ as shown in FIG. 5A. Similarly, the symbols $$T_{21} = \frac{(S_1 + S_2)}{\sqrt{2}} \text{ and } T_{22} = \frac{(jS_1 - jS_2)}{\sqrt{2}}$$

will be transmitted via antenna 1 and antenna 2, respectively, when precoding is done using precoding matrix $P_2$ as shown in FIG. 5B. It should be noted that precoding is done on an OFDM subcarrier level before the IFFT operation as illustrated in FIGS. 5A and 5B.

An example of MEMO precoding is Fourier-based precoding. A Fourier matrix is a N×N square matrix with entries given by:

$$P_{mn} = e^{j2\pi mn/N} \, m,n=0,1,\ldots(N-1) \quad (3)$$

A 2×2 Fourier matrix can be expressed as:

$$P_2 = \frac{1}{\sqrt{2}} \begin{bmatrix} 1 & 1 \\ 1 & e^{j\pi} \end{bmatrix} = \frac{1}{\sqrt{2}} \begin{bmatrix} 1 & 1 \\ 1 & -1 \end{bmatrix} \quad (4)$$

Similarly, a 4×4 Fourier matrix can be expressed as:

$$P_4 = \frac{1}{\sqrt{4}} \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix} \quad (5)$$

Multiple precoder matrices can be defined by introducing a shift parameter (g/G) in the Fourier matrix as given by:

$$P_{mn} = e^{\frac{j2\pi m}{N}\left(n+\frac{g}{G}\right)} m, n = 0, 1, \ldots (N-1) \quad (6)$$

A set of four 2×2 Fourier matrices can be defined by taking G=4. These four 2×2 matrices with g=0, 1, 2 and 3 are written as:

$$P_2^0 = \frac{1}{\sqrt{2}} \begin{bmatrix} 1 & 1 \\ 1 & -1 \end{bmatrix} P_2^1 = \frac{1}{\sqrt{2}} \begin{bmatrix} 1 & 1 \\ e^{j\pi/4} & -e^{j\pi/4} \end{bmatrix} \quad (7)$$

-continued $$P_2^2 = \frac{1}{\sqrt{2}}\begin{bmatrix} 1 & 1 \\ e^{j\pi/2} & e^{j3\pi/4} \end{bmatrix} \quad P_2^3 = \frac{1}{\sqrt{2}}\begin{bmatrix} 1 & 1 \\ e^{j3\pi/4} & -e^{j3\pi/4} \end{bmatrix} \quad (8)$$

In a transmission path from a base station to a user equipment (UE), i.e., downlink transmission, the precoding matrix is usually determined in dependence upon a precoding feedback information that is transmitted by the user equipment to the base station. The precoding feedback information typically includes precoding-matrix identity.

Figure 6:
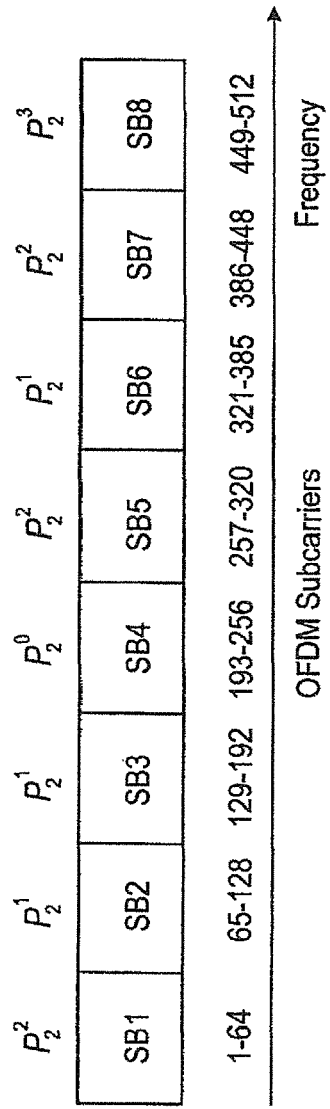
FIG. 6 is an illustration of an example of MIMO precoding on different subbands suitable for the practice of the principles of the present invention.

When the total bandwidth in an OFDM system is divided into a plurality of subbands, each subband being a set of consecutive subcarriers, due to frequency-selective fading in the OFDM system, the optimal precoding for different subbands (SBs), can be different, as shown in one example illustrated in FIG. 6. That is, in FIG. 6, different SBs use different precoding matrix. Subband 1 (SB1) which includes continuous OFDM subcarriers 1 through 64, use precoding matrix $P_2^2$; SB2 which includes continuous OFDM subcarriers 65 through 128, use precoding matrix $P_2^1$, etc. Therefore, the precoding feedback information is transmitted on a subband basis. Moreover, due to feedback errors, the base station also needs to inform the user equipment of the precoding information used on transmitted subbands. This results in additional signaling overhead in the downlink.

Figure 7:
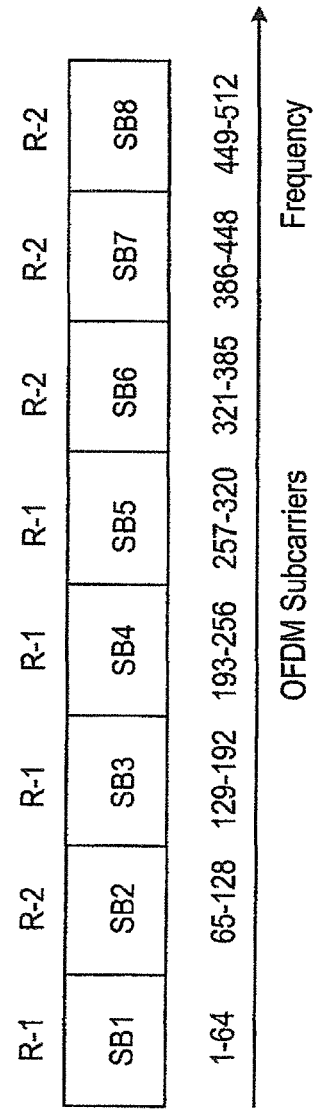
FIG. 7 is an illustration of an example of MIMO rank on different subbands suitable for the practice of the principles of the present invention.

Besides precoding information, another form of feedback information is rank information, i.e., the number of MIMO layers. A MIMO layer is a spatial channel that can carry data symbols. It is well known that even when a system can support 4×4 MIMO, rank-4 (4 MIMO layers) transmissions are not always desirable. The MIMO channel experienced by the UE generally limits the maximum rank that can be used for transmission. In general for weak users in the system, a lower rank transmission is preferred over a higher rank transmission from the throughput perspective. Moreover, due to frequency-selective fading, optimal rank may be different on different subbands. As shown in the example of FIG. 7, SB1 uses rank-1 transmission; SB2 uses rank-2 transmission, etc. Therefore, the UE needs to include the rank information in the feedback information on a subband basis. Also, due to a possibility of feedback errors, the base station additionally needs to indicate the transmitted MIMO rank on is different subbands. The rank information can also be common across the subbands, that is, a single rank value is reported for all the subbands. In any case, this results in additional overhead on the downlink.

Figure 8:
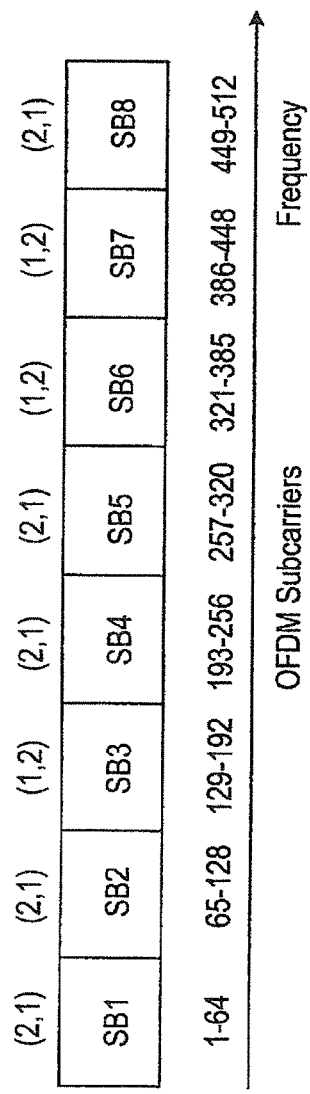
FIG. 8 is an illustration of an example of MIMO layer ordering on different subbands for a 2×2 MIMO system suitable for the practice of the principles of the present invention.

Still another form of MIMO feedback information is layer ordering information. In the example of FIG. 8, the layer order for SB1, SB2, SB4, SB5 and SB8 is layer 2, and then layer 1; while the layer order for SB3, SB6 and SB7 is layer 1, and then layer 2. The layer ordering information is generally transmitted by the UE and also indicated by the base station in control signaling on the downlink. The ordering of layers can be based on the channel quality they experience or other similar criteria.

Another form of MIMO feedback information which applies to both MIMO and non-MIMO scenarios is the selected subbands for transmission. In this case, the MIMO feedback information such as precoding, rank, IDs of selected layers and layer ordering is provided for the selected subbands only. In this case, however, both the UE and the base station need to signal the information on the selected subbands.

Figure 9:
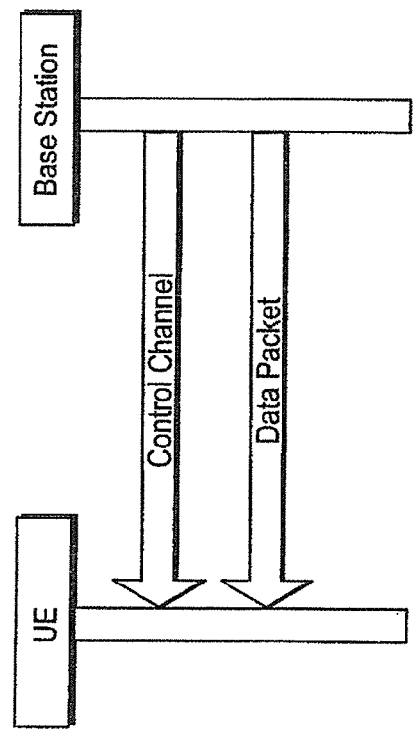
FIG. 9 is an illustration of control signaling in a wireless communication system suitable for the practice of the principles of the present invention.

In packet-based wireless data communication systems, a control signal accompanies the data transmission as shown in FIG. 9. In the 3$^{rd}$ Generation Long Term Evolution (3G LTE) system, the control channel that carries the control signal is referred to as Physical Downlink Control Channel (PDCCH). The PDCCH carries information such as UE ID, resource assignment information, Payload size, modulation, Hybrid Automatic Repeat-reQuest (ARQ) HARQ information, MIMO related information.

As described above, when the base station transmits data to the user equipment, the base station determines a transmission format in dependence upon the MIMO information that is inform by the user equipment through a feedback message. Contemporarily, the base station transmits the MIMO information, based on which the transmission format of the data is determined, together with the data, to the user equipment.

In the present invention, we have constructed a protocol where the base station does not need to explicitly signal those items of the MIMO information such as precoding, rank, selected MIMO layers and layer ordering, etc. in a downlink transmission. The base station simply indicates the identification of the feedback message to the user equipment in conformance with the protocol used by the base station to perform the MIMO transmission format.

Figure 10:
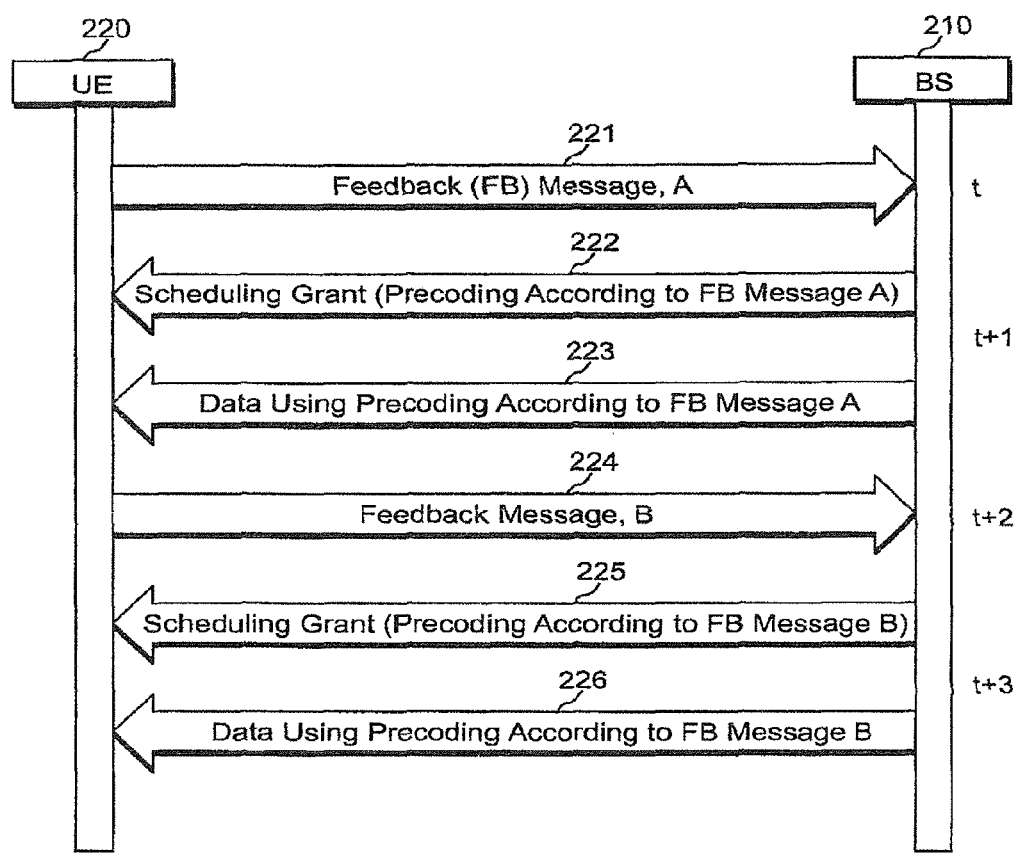
FIG. 10 illustrates MIMO feedback and signaling according to a first embodiment of the principles of the present invention.

FIG. 10 illustrates MIMO feedback and signaling according to a first embodiment of the principles of the present invention. In this first embodiment, a base station (BS) 210 simply indicates the identification of the feedback message to UE 220 in accordance with the protocol used by base station 210 to perform the MIMO transmission format. Specifically, at time t, US 220 transmits feedback message A 221 in response to a reference signal or a pilot signal received from base station 210. Feedback (FB) message A 221 contains information such as selected subbands, precoding, rank and layer ordering, etc. At the same time, when UE 220 transmits feedback message A 221, UE 220 also stores the information in feedback message A 221 in a buffer (not shown). At time (t+1), base station 210 sends control message 222 and data 223 to UE 220. Instead of transmitting feedback message A back to UE 220, base station 210 indicates in the control message that the format for data transmission is determined based on feedback message A 221. Subsequently, UE 220 already knows the feedback information feedback message A and therefore reads the feedback message A 221 stored in the buffer and processes the received data transmission according to the information in feedback message A. In this way, base station 210 does not have to explicitly transmit the precoding or other MIMO information such as rank and layer ordering to UE 220 in the downlink transmission. At time (t+2), base station 210 receives updated feedback information carried in feedback message B 224 from UE 220. Feedback message B 224 is generated in response to another reference signal received from base station 210. At time (t+3), base station 210 performs data transmission to UE 220 using the updated feedback information feedback message B 224. Base station 210 also indicates in control message 225 that the condition for data transmission including precoding, rank and layer ordering is determined based on feedback message B. UE 220 then processes received information data 226 according to the information indication in feedback message B 224 that UE 220 has already stored.

Figure 11:
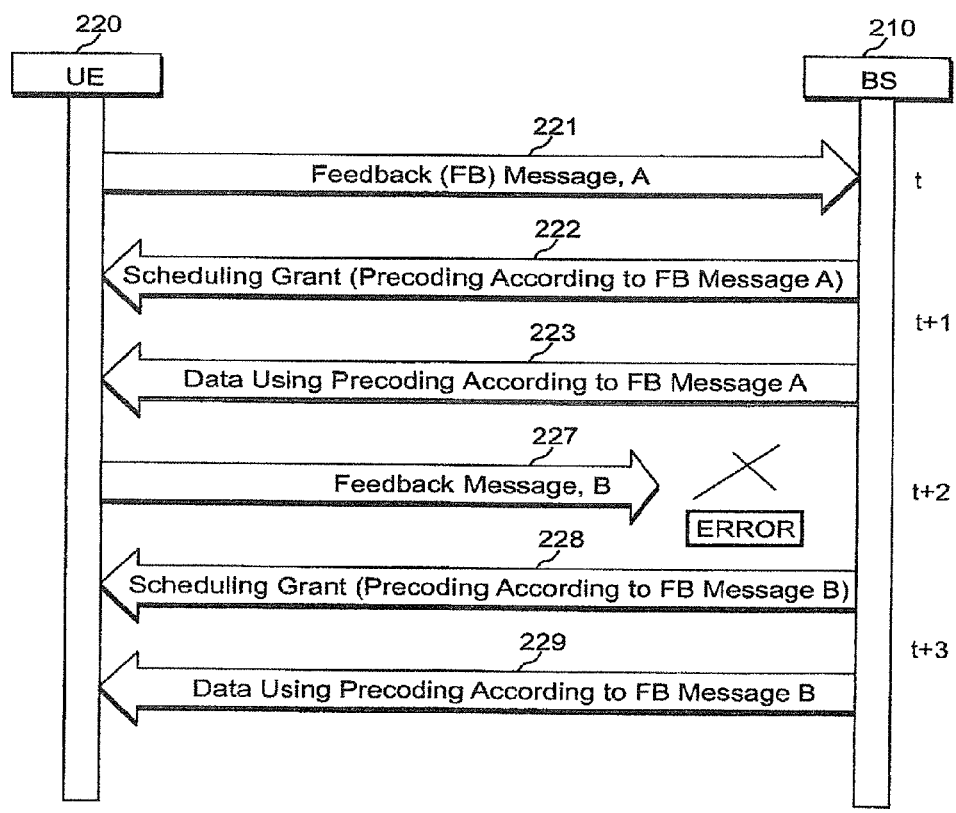
FIG. 11 illustrates MIMO feedback and signaling according to a second embodiment of the principles of the present invention.

In a second embodiment according to the principles of the present invention as shown in FIG. 11, base station 210 uses feedback from an earlier feedback message because the most recent feedback message contains error as detected by some erasure detector or Cyclic Redundancy Check (CRC) unit. In the example of FIG. 11, base station 210 performs a transmission at time (t+3) according to feedback message A 221 received earlier at time t because feedback message B 227 received at time (t+2) contained errors. UE 210 then processes the received data 229 according to the information, such as precoding, rank and layer ordering information, carried in feedback message A 221. This scheme assures that the UE always decodes the information using a correct format as confirmed by the base station.

Figure 12:
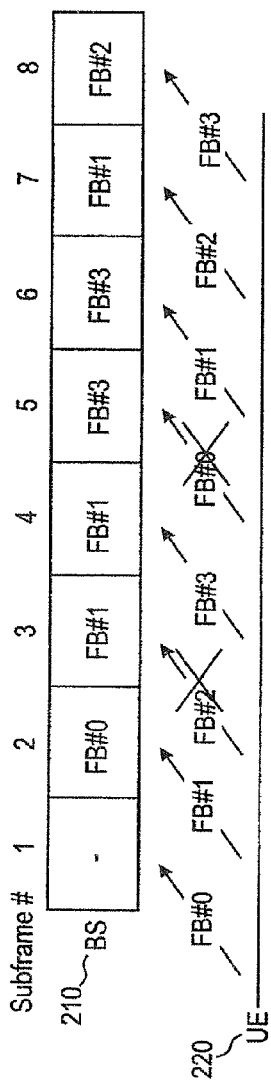
FIG. 12 illustrates MIMO feedback and signaling according to a third embodiment of the principles of the present invention.

In a third embodiment of the principles of the present invention as shown in FIG. 12, the Feedback (FB) messages are numbered with sequence numbers 0, 1, 2 and 3 in the order of generation by UE 220. This would require 2-bits overhead to indicate the sequence numbers 0 through 3. Base station (BS) 210 informs UE 220 of the sequence number of the FB message that is used for determining format for MIMO transmission. In the third embodiment as shown in FIG. 12, the time for data transmission is divided into a plurality of subframes. In subframe #1, BS 210 receives FB #0 message. In subframe #2, BS 210 performs data transmission to UE 220 according to the transmission format determined based the information carried in FB#0, and simultaneously receives FB#1 message from UE 220. In subframe#3, the transmission is performed by BS 210 according to the transmission format determined based on FB#1 message received in subframe#2, and BS 210 simultaneously receives FB#2 message from UE 220. But BS 210 detects that FB#2 message contains error. Therefore, base station 210 ignores FB#2 message and performs transmission according to FB#1 message in subframe#4. This scheme assures that UE always know the FB message used to determine the format (i.e. precoding, rank and layer ordering etc.) of the MIMO transmission.

Figure 13:
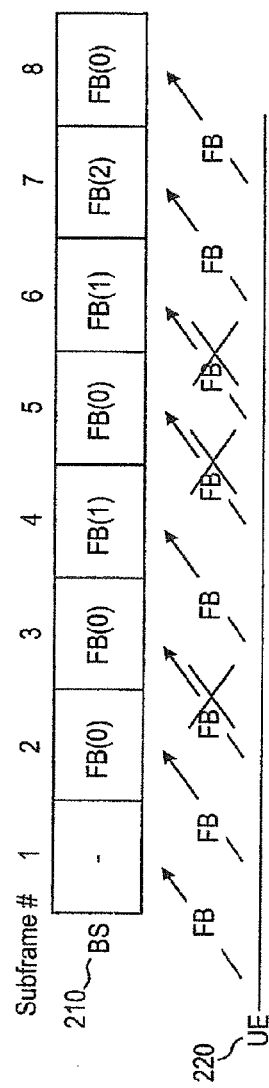
FIG. 13 illustrates MIMO feedback and signaling according to a fourth embodiment of the principles of the present invention.

In a fourth embodiment according to the principles of the present invention as shown in FIG. 13, the Feedback (FB) messages transmitted by UE 220 are not sequentially numbered. Instead, base station 210 transmits one of four possible combinations of binary symbols 0 and 1. These combinations indicate which previously received FB message is used to determine format for MIMO transmission. Based on the received combination, UE 220 can determine which FB message is actually used for MIMO transmission in a given subframe. In the example of FIG. 13, in subframe#2 and subframe#3, base station 210 transmits FB(0) message (i.e., combination of '0' and '0') in control signal, which indicates that the most recent FB message was used for determining the MIMO transmission format. In subframe#3, FB message is received in error, and therefore in subframe#4, base station 210 indicate FB(1) message (i.e., combination of '0' and '1') which means that the FB message received prior to the most recent message is used for determining MIMO transmission format. UE 220 can then processes the received signal according to the FB message which is sent in subframe#2 because UE 220 knows that FB message in subfrmae#3 was received in error. In subframe#5, the received FB message contains error, and therefore in subframe#6 base station 210 transmits FB(1) message to UE 220 to indicate that the transmission format in subframe#6 was determined based on the FB message that is earlier than the most recent FB transmitted by UE 220. In subframe#6, the received FB message contains error again, and therefore in subframe#7 base station 210 transmits FB(2) message (i.e., combination of '1' and '0') to UE 220 to indicate that the transmission in subframe#7 was determined based on the FB message received before the two recent FB messages received from the UE. Note that the formats for transmission by BS 210 in subframe#6 and subframe#7 are the same because there was no correctly received FB message in subframe#6 and subframe#7. It should also be noted that the same goal can be achieved if the combinations indicate how many previous consecutive FB messages were received in errors with indication of 0 through 3.

Figure 14:
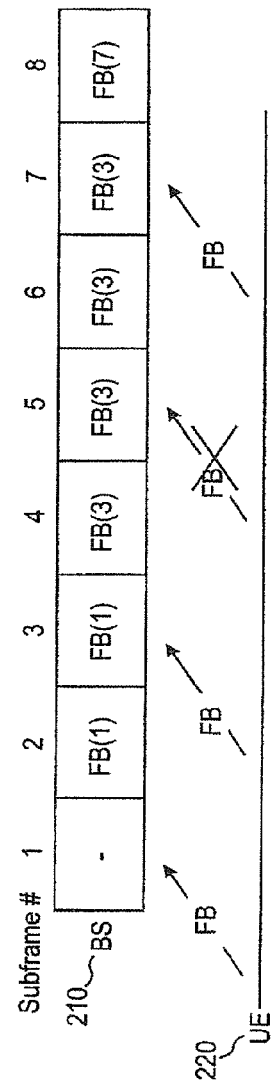
FIG. 14 illustrates MIMO feedback and signaling according to a fifth embodiment of the principles of the present invention.

In a fifth embodiment according to the principles of the present invention as shown in FIG. 14, the Feedback (FB) messages are not sequentially numbered. We also assume that MIMO FB messages are sent in every 2 subframes. Note that the MIMO feedback rate in the time domain can be configured by the network. In the fifth embodiment, base station 210 indicates the subframe number in which the FB is received and is used for determining MIMO transmission format in the downlink. This indication is done on the downlink control channel that accompanies the downlink data transmission. As shown in FIG. 14, in subframe#2 and subframe#3, the MIMO transmission format, which includes preceding, rank, IDs of selected layers and layer ordering, is determined using the FB message received in subframe#1. This is indicated by FB(1) indication. In subframe#4 through subframe#7, the MIMO transmission format is determined according to the FB message received in subframe#3. This is indicated by FB(3) indication. Note that FB message in subframe#5 is received in error and hence is not used. Finally in subframe#8, the MIMO format corresponding to FB message in subframe#7 is used.

In a sixth embodiment of the current invention, a 1-bit indication is used to indicate whether the MIMO transmission format including precoding, rank, IDs of selected layers and layer ordering information is determined based on the most recent UE feedback message or not. If the base station decides to use another transmission format than the one determined based on the most recent UE feedback message for data transmission, this other transmission format is explicitly transmitted to the UE as shown in FIG. 15. A '0' in the control information indicates that the MIMO transmission format is determined using the most recent FB message received. A '1' in the control information indicates that the MIMO transmission format is carried explicitly. The MIMO transmission format can then be separately coded, modulated or jointly coded, modulated with other downlink control information and transmitted by the base station. An explicit MIMO format indication may be necessary when the base station uses different MIMO format than one reported by the UE or if the most recent FB message was received erroneously and base station uses MIMO format according to an earlier FB message.

In a seventh embodiment according to the principles of the current invention as shown in FIG. 16, the MIMO feedback is provided for part of the whole bandwidth in a given FB message. In the example of FIG. 16, FB#1 covers the lower half of the bandwidth while FB#2 covers the upper half of the bandwidth. In this case, the base station can indicate that MIMO transmission format (precoding, rank, IDs of selected layers and layer ordering etc.) is determined either according to FB#1 if the UE is scheduled in the left half of the bandwidth or according to FB#2 if the UE is scheduled in the right half of the bandwidth. If the UE is scheduled in both left and right halves then the base station needs to indicate both FB#1 and FB#2. Also, the base station can simply indicate the MIMO transmission format by 1-bit indication if the most recent FB#1 and FB#2 are used for transmission or MIMO transmission format is explicitly indicated.

Figure 17:
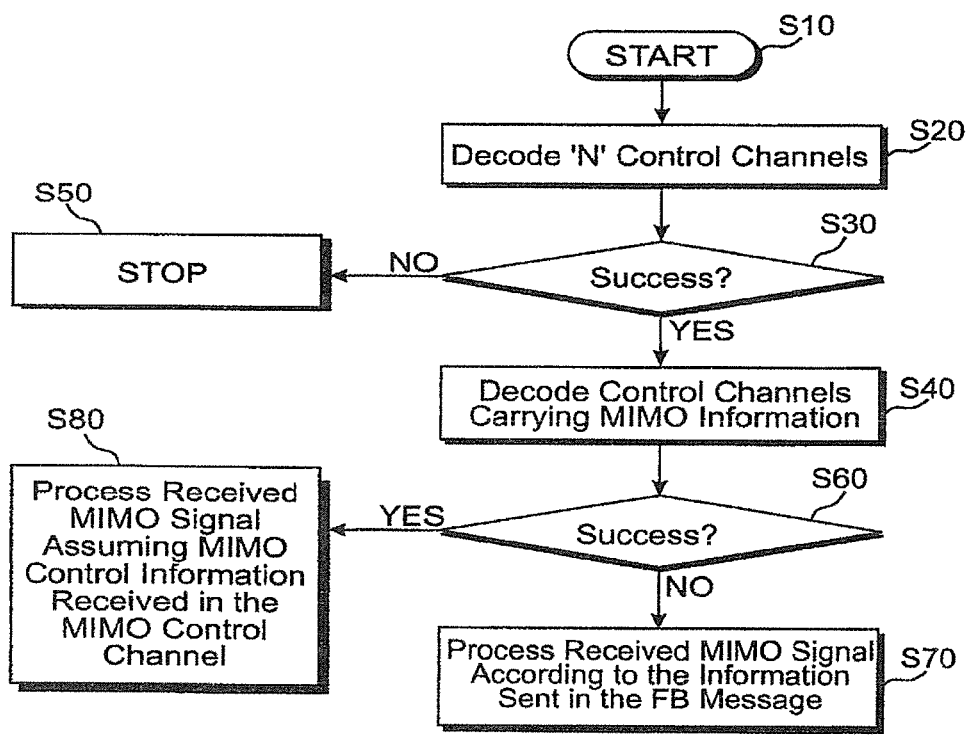
FIG. 17 is a flow chart showing the processing of MIMO signals according to an eighth embodiment of the principles of the present invention.

In an eighth embodiment according to the principles of the current invention as shown in FIG. 17, the base station always transmit the MIMO transmission format explicitly, and the user equipment always try to decode the control message that contains the MIMO transmission format information. FIG. 17 illustrates a flow chart of the processing of MIMO signals according to the principles of the current invention. In this embodiment, no 1-bit indication informing the UE if MIMO format is explicitly signaled or not is used in the regular control message. After a UE receives control message through control channels from a base station (step S10), the UE decodes the control message carried through the control channels at step S20 to determine which part of the control message carries MIMO transmission format information and which part of the control message carries information regarding the UE ID/CRC, etc. Then at step S30, the UE determines whether the decoding process performed at step S20 is successful. If the decoding process is not successful, the UE stops the process (step S50). Otherwise, if the decoding process at step S20 is successful, the UE tries to decode the part of the control message that contains the MIMO transmission format (precoding, rank and selected layers etc.) at step S40. Then at step S60, the UE determines whether the decoding process performed at step S40 is successful. If the decoding succeeds, the UE processes the signal received from the base station according to MIMO transmission format information contained in the control message (step S80). If the decoding fails, the UE processes the signal received from the base station assuming that the base station used the MIMO transmission format that is determined based on to most recent Feedback message transmitted from the UE.

In a ninth embodiment according to the principles of the current invention, the base station uses a plurality of common MIMO transmission formats (precoding, rank and selected layers etc.) on all the data scheduled to be transmitted to the UE in cases when the base station does not use the MIMO transmission format that is determined based on the FB message reported by the UE. In this way, a MIMO format indication field including a fixed amount of bits (2-6 bits) can be included in the Physical Downlink Control Channel (PDCCH) as shown in Format I in FIG. 18. In case where the BS uses the subband specific MIMO transmission format determined based on the UE feedback, a certain combination of bits (e.g. '00' for 2-bits and '000000' for 6-bits) included in the MIMO format field will indicate this. As shown in Table 1, '000000' in the MIMO format indication field in PDCCH indicates that the base station uses the MIMO transmission format based on the most recent FB message transmitted from the UE; '000001' in the MIMO format indication field in PDCCH indicates that the base station uses the MIMO transmission format based on one-earlier than the most recent FB message transmitted from the UE; '000010' 000001' in the MIMO format indication field in PDCCH indicates that the base station uses the MIMO transmission format based on two-earlier than the most recent FB message transmitted from the UE. Therefore, if the base station is using subband specific MIMO transmission format determined based on UE feedback, the MIMO format field in the PDCCH will indicate this. In case when the base station overrides the UE feedback, the base station transmits a MIMO format indication selected from '000011' through '111111' to the UE to indicate that a common MIMO format selected from the sixty-one common MIMO transmission formats will be used for all the allocated resource blocks (RB, i.e., the minimum frequency subband) and indicated in the MIMO format field. It should be noted that in this case another format Format 0 (not including MIMO format field) may be required for PDCCH. This format can be used in cells not supporting MIMO. It should be noted that there will be no need to perform a blind detection between Format 0 and Format I because these formats will not be used simultaneously in a cell.

TABLE 1

An Example of MIMO format indication on the downlink for support of SU-MIMO

| 6-bits MIMO Information (MI) in the downlink | Purpose |
| --- | --- |
| '000000' | BS uses MIMO transmission format determined based on the most recent Feedback from the UE |
| '000001' | BS uses MIMO transmission format determined based on one-earlier than the most recent UE Feedback from the UE (assuming BS detected errors in the most recent UE Feedback) |
| '000010' | BS uses MIMO transmission format according to two-earlier Feedback than the most recent UE Feedback from the UE UE (assuming BS detected two consecutive errors in the UE Feedback) |
| '000011-111111-' | BS overrides the UE feedback and uses a common MIMO transmission format for all the RBs allocated to the UE. This common MIMO transmission format is indicated by one out of the 61 combinations (4-63). |

It should be noted that in the ninth embodiment of the present invention, the UE needs to store the information carried in the three previous Feedback messages. Based upon the MIMO Information (MI) field in the PDCCH, the UE uses the information in the corresponding Feedback message or the MIMO format indicated in the MIMO format field to process the received MIMO signal. It should be noted that this approach also applies to the schemes where UE Feedback is provided for the "best-M" subbands (the subbands having the highest channel quality indication) or over part of the total bandwidth.

It is also possible to use another bits combination in another field in the control message such as payload size field, modulation, HARQ information or resource allocation fields indicating that Node-B is following the MIMO format according to the feedback from the UE.

What is claimed is:

1. A method for receiving data at a user equipment (UE), comprising:
    generating at least one feedback message in response to at least one reference signal received from a base station (BS);
    transmitting the at least one feedback message to the BS;
    storing the at least one feedback message in a memory in the UE; and
    processing data received from the BS based on the at least one stored feedback message in response to a control message from the BS that corresponds to the received data.

2. The method of claim 1, wherein the at least one stored feedback message is a feedback message most recently generated at the UE.

3. The method of claim 1, wherein the at least one stored feedback message is determined based on a predefined value of a format indication field in Physical Downlink Control Channel (PDCCH) the control message.

4. The method of claim 3, wherein a value of 000000 as the predefined value of the control message indicates that the at least one stored feedback message is a feedback message most recently generated at the UE.

5. The method of claim 1,
    wherein the control message includes an indicator that indicates precoding according to a precoding matrix indicator (PMI) reported by the UE.

6. The method of claim 1, wherein the feedback message contains information regarding one or more of selected sub-bands, precoding, rank and layer ordering.

7. A method for receiving data at a user equipment (UE), comprising:
   in response to a reference signal received from a base station (BS), generating a feedback message;
   transmitting the feedback message to the BS;
   storing the feedback message in a memory in the UE within which at least one earlier feedback message was previously stored;
   and
   processing data received from the BS based on one of the stored feedback messages in response to a value within a control message from the BS that corresponds to the received data.

8. The method of claim 7, wherein the one of the stored feedback messages is a feedback message most recently generated at the UE.

9. The method of claim 7, wherein the one of the stored feedback messages is a feedback message generated earlier than a feedback message most recently generated at the UE.

10. The method of claim 7, wherein the value is a predefined value of a format indication field in the control message.

11. The method of claim 10, wherein the value 000000 as the predefined value of the control message indicates that the one of the stored feedback messages is a feedback message most recently generated at the UE.

12. The method of claim 7,
   wherein the control message includes an indicator that indicates precoding according to a precoding matrix indicator (PMI) reported by the UE.

13. The method of claim 7, wherein the feedback message contains information regarding one or more of selected sub-bands, precoding, rank and layer ordering.

14. A method for receiving data at a user equipment (UE), comprising:
   in response to each of a plurality of reference signals received from a base station (BS), generating a feedback message;
   transmitting each feedback message to the BS;
   storing at least one of the feedback messages in a memory in the UE;
   and
   processing data received from the BS based on a transmission format specified within the at least one stored feedback message in response to a value within a control message from the BS that corresponds to the received data.

15. The method of claim 14, wherein the at least one stored feedback message is a feedback message generated earlier than a feedback message most recently generated at the UE.

16. The method of claim 14, wherein the value is a predefined value of a format indication field in the control message.

17. The method of claim 16, wherein the value 000000 as the predefined value of the control message indicates that the at least one stored feedback message is a feedback message most recently generated at the UE.

* * * * *